United States Patent
Lee et al.

(10) Patent No.: US 10,430,884 B2
(45) Date of Patent: Oct. 1, 2019

(54) APPARATUS AND METHOD FOR TRADE AGGREGATION OF TRADE ALLOCATIONS AND SETTLEMENTS

(71) Applicant: ITG SOFTWARE SOLUTIONS, INC., Culver City, CA (US)

(72) Inventors: Ronald D. Lee, Merrimack, NH (US); Mervin C. Newell, Victorville, CA (US); Scott H. Kurland, New York, NY (US); Ian P. L. Hoenisch, Windham, NH (US); James B. Weiner, Newington, NH (US); Gerald B. Drayer, Lake Grove, NY (US); Robert L. Sher, New York, NY (US)

(73) Assignee: Virtu ITG Software Solutions LLC, Culver City, CA (US)

( * ) Notice: Subject to any disclaimer, the term of this patent is extended or adjusted under 35 U.S.C. 154(b) by 0 days.

(21) Appl. No.: 15/707,652

(22) Filed: Sep. 18, 2017

(65) Prior Publication Data
US 2018/0005321 A1    Jan. 4, 2018

Related U.S. Application Data

(63) Continuation of application No. 13/661,705, filed on Oct. 26, 2012, now Pat. No. 9,767,514, which is a
(Continued)

(51) Int. Cl.
*G06Q 40/00* (2012.01)
*G06Q 40/04* (2012.01)
*G06Q 40/02* (2012.01)

(52) U.S. Cl.
CPC ............. *G06Q 40/04* (2013.01); *G06Q 40/00* (2013.01); *G06Q 40/02* (2013.01); *G06Q 40/10* (2013.01)

(58) Field of Classification Search
CPC .................................................. G06Q 40/00
See application file for complete search history.

(56) References Cited

U.S. PATENT DOCUMENTS

| | | | |
|---|---|---|---|
| 2002/0049661 A1* | 4/2002 | Otero | G06Q 30/02 705/37 |
| 2002/0087454 A1 | 7/2002 | Calo et al. | |

(Continued)

OTHER PUBLICATIONS

Peter Chapman, Algorithmic Aggregator, Nov. 30, 2004, Tradersmagazine, web, pp. 1-3 (Year: 2004).*
(Continued)

*Primary Examiner* — I Jung Liu
(74) *Attorney, Agent, or Firm* — Prince Lobel Tye LLP

(57) ABSTRACT

A post-trade aggregation system for financial instrument trading systems, wherein a trader manages a plurality of trade orders to be executed by one or more executing brokers on behalf of customers via a data interface system. The plurality of trade orders includes at least one wrap block order and at least one institutional block order. The plurality of trade orders are merged into a single merged block order, apportioned into a plurality of smaller electronic trade orders, and transmitted to a plurality of order destinations. One or more computer systems are in electronic communication with the data interface system and with a clearing system, and configured to compress individual executions from the plurality of order destinations corresponding to the plurality of smaller electronic trade orders into a single net marked-up step-out for wrap orders and a single average-priced block for institutional orders.

3 Claims, 10 Drawing Sheets

Related U.S. Application Data continuation-in-part of application No. 12/165,322, filed on Jun. 30, 2008, now Pat. No. 8,341,067.

(56) References Cited

U.S. PATENT DOCUMENTS

| | | |
|---|---|---|
| 2002/0087455 A1 | 7/2002 | Tsagarakis et al. |
| 2003/0050879 A1 | 3/2003 | Rosen et al. |
| 2005/0102220 A1 | 5/2005 | Stackpole |
| 2006/0026090 A1 | 2/2006 | Balabon |

OTHER PUBLICATIONS

Peter Chapman, "Algorithmic Aggregator", Nov. 30, 2004, Tradersmagazine. Jun. 3, 2009, <www.tradersmagazine.com/issues/2004113/2090-1.html>.
Investment Technology Group, Inc., "Teaming of ITG(R) and ESP Brings Brokerage Community Greater Flexibility in Anonymous Crossing and Algorithmic Trading," Bloomberg.com (Mar. 9, 2005).
Schwartz, "Whole in one for the buy-side: Algorithmic network provides aggregated no-touch access," The Trade, Issue 3 (Jan.-Mar. 2005).
"The Algorithmic Aggregator," Traders Magazine (Dec. 2004).
Securities Industry Association, "Institutional Transaction Processing Model" (May 2002).
Ameel, "Settlement Aggregation: Reducing Transaction Costs and Achieving Best Execution" (May 2009).
Ameel, "Half the picture in a fragmented market," The Trade, Issues 18 (Oct.-Dec. 2008).
Central Counterparty Clearing, <http:/en.wikipedia.org/wiki/Central_Counterparty_Clearing> (last modified Dec. 10, 2008).
ESP Technologies Corp., "Broker CSA Accural Solution for Clearvoyance Institutional Clients" (2007-2008).
ESP Technologies Corp., "Clearvoyance (TM) Post-Trade Settlement Aggregation Technology" (Aug. 20, 2008).
ESP Technologies Corp., "Linedata Services: ESP Clearvoyance" (2007-2008).
ESP Technologies Corp., "ESP Launches Central Counterparty Clearing (TM) in Asia" (Oct. 26, 2007).
Winters et al., "Picking up the pieces: A back-office tale," The Trade, Issues 15, pp. 102-103 (Jan.-Mar. 2008).
ESP Technologies Corp., "ESP Technologies Integrates Settlement Aggregation Services with INDATA" (Mar. 31, 2008).
The TRADETech Daily, "More fog settles on clearing" Issue 4, p. 27 (2008).
ESP Technologies Corp., "ESP Technologies Integrates Linedata with Clearvoyance (TM) Settlement Aggregation" (May 13, 2008).
The Trade News, "ESP integrates settlement aggregator with Linedata" (May 14, 2008).
Sher, The Trade, "The future of wrap," Issue 16, pp. 40-41 (Apr.-Jun. 2008).
CMP Media, LLC, "Consolidated Clearing: Obstacles and Evolution," Advanced Trading, <http:www.advancedtrading.com/show/Article.jhtml?articleID=210200850> (Aug. 27, 2008).
Sher, "ASP Virtual Roundtable, Buy-Side Technology ASP Supplement 2008," p. 27 (Jul. 2008).
ESP Technologies Corp., "INDATA:ESP Clearvoyance" (2007-2008).
Investment Technology Group, Inc., ITG Single Ticket Clearing, <http://www.itg.com/offerings/single_ticket_clearing.php> (visited Jan. 28, 2009).
Operations Management, ITG Looks to Expand Reach of Trade Aggregation Platform, <http://www.operationsmanagement.com/article.aspx?articleID=1939051> (May 29, 2008).
Operations Management, "ITG—For single ticket clearing capability," <http://www.operationsmanagement.com/article.aspx?articleID=1966049> (Jul. 3, 2008).
Groenfeldt, "Turning point for trading costs," Institutional Investor Magazine (Nov. 2008), pp. 43-44.
ESP Technologies Corp., "Clearvoyance (TM) Post-Trade Settlement Aggregation Technology."
ESP Technologies Corp., "Clearvoyance(TM) Benefits for Wrap/SMA Managers."
ESP Technologies Corp., "Settlement Aggregation Services for Wrap/SMA Managers."
Kurland et al., U.S. Appl. No. 11/311,885, filed Dec. 19, 2005.
International Search Report and Written Opinion of the International Searching Authority received in PCT/US2009/049199 (dated Aug. 6, 2009).
Johannes Prix et al., Algorithmic Trading Patterns in Xetra Orders, Dec. 2007, The European Journal of Finance, vol. 13, 718-737.

* cited by examiner

APPARATUS AND METHOD FOR TRADE AGGREGATION OF TRADE ALLOCATIONS AND SETTLEMENTS

RELATED APPLICATION DATA

This application is a continuation application of application Ser. No. 13/661,705 filed on Oct. 26, 2012, which is a continuation-in-part (CIP) application of application Ser. No. 12/165,322, now U.S. Pat. No. 8,341,067, issued on Dec. 25, 2012, entitled APPARATUS AND METHOD FOR TRADE AGGREGATION OF TRADE ALLOCATIONS AND SETTLEMENTS, filed on Jun. 30, 2008, the entire contents of which are incorporated herein by reference.

BACKGROUND OF THE INVENTION

Field of the Invention

The present invention relates generally to electronic trading of financial instruments and, more particularly, to an improved system and method for post-trade aggregation processing of executed instruments.

Description of the Related Art

Customers often execute trades with multiple brokers for a number of reasons, such as to find liquidity, adhere to best execution, and reduce market impact. Such customers also trade on behalf of many custodial customer accounts, resulting in numerous trade allocations on any given trading day. With existing securities order processing and routing systems, such trade allocations may incur substantial custodial "per-trade" ticket fees, which the custodial banks charge in order to process, settle, and affirm executions that come in from the various brokers who execute the trades.

Heretofore, the process of trade compression has been limited to executions done on exchanges and electronic communication networks (ECNs) where the brokerage firm itself is a direct member of that exchange or ECN. Additionally, existing aggregation processing systems also incorporate order management systems, thereby requiring customers who want to reduce the "pertrade" ticket fees through post-trade aggregation to either purchase an entirely new system or pay the additional ticket costs. Thus, there exists a need for a system compatible with the customers' existing technologies which allows them to compress trades executed across multiple brokers or order destinations internally. The present disclosure contemplates a new and improved order aggregation and clearing system, for securities and other financial instruments which overcomes the above-referenced limitations and others.

SUMMARY OF THE INVENTION

According to an embodiment of the present invention, the order allocation system is further configured to optimize the allocation of trades to various ATSs according to two primary principles: first, optimizing orders based on the nature of flow in a given dark pool; second, allocating only to as many dark pools as are needed to maintain fill rate. In one aspect, a customer's order management system sends and receives a trade order from the customer to a financial instrument trading system. The financial instrument trading system includes an order staging and optimization interface. The order management system, and/or order staging and optimization interface, includes means for apportioning the order into a plurality of smaller orders. The order management system and/or staging and optimization interface then communicates the plurality of smaller orders to a plurality of order destinations. The individual executions or fills from the plurality of order destinations are delivered back to the order management system and then to the allocation middleware where the individual executions are compressed into a single average-priced block.

In a further aspect, an apparatus includes a computer-based information handling system having a storage device storing instructions to be executed by the computer-based information handling system to receive a plurality of individual financial instrument trade executions from the plurality of order destinations, combine the plurality of individual financial instrument trade executions into a single average-priced block, and deliver the single average priced block and allocation instructions to a clearing agent for delivery to custodial agents.

In another aspect, a method for trading financial instruments is provided wherein a trade order is prepared and apportioned into a plurality of smaller trade orders. The plurality of smaller trade orders are communicated to a plurality of order destinations. For each of the plurality of smaller trade orders, the individual trade order executions are received from the plurality of order destinations, combined into a single large average-priced block, and are delivered to a post-trade aggregation system for combining the individual trade order executions into a single average-priced block and clearing.

One advantage of the present disclosure resides in the streamlining of workflow and technology. For example, customers, trading firms, and executing brokers can use their existing management systems for placing trade orders in combination with the post trade aggregation system and method of the present disclosure, which automates the clearing, delivery, and billing processes, thereby reducing the costs associated with manual processing and human-error reconciliation.

Another advantage of the present disclosure resides in the ability to facilitate trade compression across multiple executing brokers, while avoiding the need for customers to incur higher custodial costs associated with executing trades across multiple brokers. Utilizing multiple brokers and execution venues may increase liquidity and minimize market impact, which in turn can affect portfolio performance for the customer's end clients.

Another advantage of the present disclosure is that it allows the customer to seek best execution of a trade without being hindered by higher costs. The present invention also allows the customer to cope with the fragmentation of the market and trade with more varied destinations by reducing the costs of doing so.

Yet another advantage of the present disclosure is that it may result in lower costs for customers for a number of reasons, including fewer custodial tickets, fewer allocation and instruction messaging costs, fewer back-office trade-breaks, and fewer personnel required to deal with trading issues.

In a further aspect, the present disclosure provides cost savings for sell-side executing brokers since they do not have to individually allocate, deliver, and affirm trades directly to individual custodial accounts and trading firms. Business workflow is improved when brokers deliver and clear trades against one central clearing entity directly, rather than individually with multiple institutional trading firms.

In a further aspect, the present invention includes a financial instrument trading system that includes a data interface system, a system for merging the plurality of trade orders into a single merged block order, and a post-trade aggregation system. The data interface system is for managing a plurality of trade orders to be executed by one or more executing brokers on behalf of customers. The plurality of trade orders include at least one wrap block order and at least one institutional block order. The system for merging the plurality of trade orders into a single merged block order, is configured to apportion the single merged block order into a plurality of smaller electronic trade orders and to communicate the plurality of smaller electronic trade orders to a plurality of order destinations. The post-trade aggregation system is configured to receive execution data from the plurality of order destinations for individual executions corresponding to the plurality of smaller electronic trade orders and to compress the individual executions into a single net marked-up step-out for wrap orders and a single average-priced block for institutional orders.

In a further aspect, the present invention includes a post-trade aggregation system for financial instrument trading systems, wherein a trader manages a plurality of trade orders to be executed by one or more executing brokers on behalf of customers via a data interface system; the plurality of trade orders includes at least one wrap block order and at least one institutional block order. The plurality of trade orders are merged into a single merged block order, apportioned into a plurality of smaller electronic trade orders, and transmitted to a plurality of order destinations. The post-trade aggregation system includes one or more computer systems in electronic communication with the data interface system and with a clearing system. The one or more computer systems may be configured to compress individual executions from the plurality of order destinations corresponding to the plurality of smaller electronic trade orders into a single net marked-up step-out for wrap orders and a single average-priced block for institutional orders.

According to other aspects of the present invention, a method is provided for allocating and clearing electronic trade orders. The method includes a step of merging wrap and institutional conflict trade orders into a single block order in an order management system. Each trade order identifies a number of shares of a security to be traded. The method includes a step of dividing the single block order into a plurality of electronic trade orders. The method includes a step of transmitting the plurality of electronic trade orders to a plurality of trade destinations. The method includes a step of aggregating executions corresponding to the plurality of electronic trade orders. From the aggregated execution data, data for institutional shares and wrap shares may be split into separate aggregated blocks. The method includes a step of adding or subtracting blended commission rate from the average aggregated price for the wrap allocations to create a new, net average price aggregated block. The method includes steps of setting step out allocations for the executions corresponding to the wrap orders; and transmitting wrap block and step out allocations to a clearing facility.

Other benefits and advantages of the present invention will become apparent to those skilled in the art upon a reading the following description with reference to the drawing figures and understanding of the preferred embodiments.

BRIEF DESCRIPTION OF THE DRAWINGS

The accompanying drawings, which are incorporated herein and form part of the specification, illustrate various embodiments of the present invention. In the drawings, like reference numbers indicate identical or functionally similar elements.

DETAILED DESCRIPTION OF THE PREFERRED EMBODIMENTS

The present disclosure provides an improved system and method of post-trade aggregation of financial instruments through which an customer can clear, allocate, accept delivery, and affirm trades, on a compressed, average priced basis. Although described herein primarily by way of reference to financial securities or equities, it will be recognized that the present invention is amenable to all manner of financial instrument trading including without limitation domestic and international trading of stocks, bonds, options, futures, funds, and other tradable tangible and intangible commodities.

Figure 1:
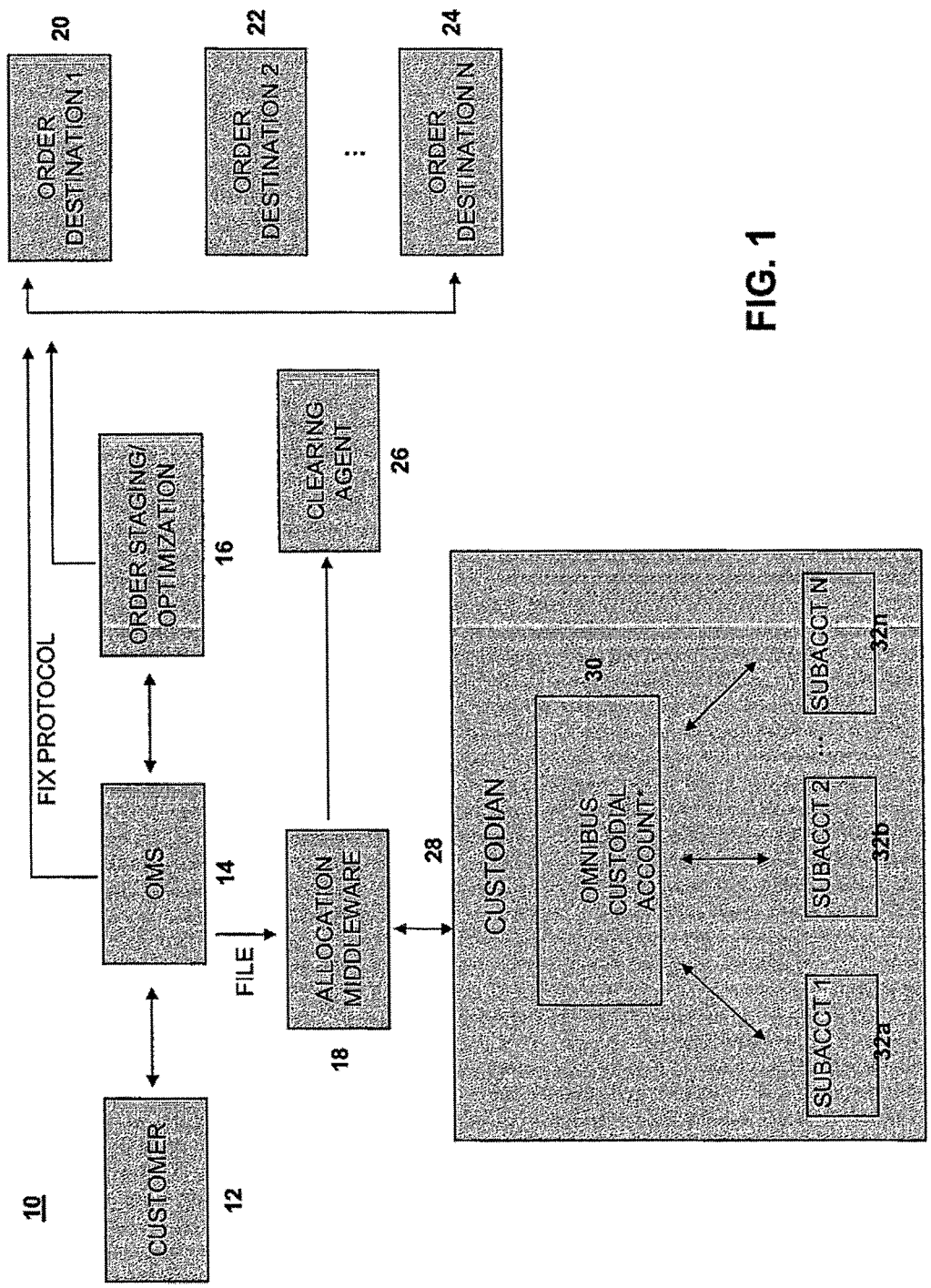
FIG. 1 is a block diagram of an equities trading system in accordance with an exemplary embodiment of the present invention.

Referring now to FIG. 1, there is shown a block diagram illustrating a trading system 10 for the clearing of securities trading orders, and for the allocation and delivery of the respective shares, in accordance with an exemplary embodiment of the present invention.

As depicted in FIG. 1, the trading system 10 may be used by a customer 12, which may be, without limitation, a pension fund, mutual fund, investment manager, broker/dealer, hedge fund, or the like, and may be a customer that trades on behalf of multiple custodial accounts. The customer 12 is in communication with its order management system (OMS) 14, which may be hosted, for example, on a computer-based information handling system of the customer 12 or of a brokerage company that buys and sells securities on behalf of the customer 12. It will be recognized that the order management system 14 can be any type of buy-side trade allocation and settlement system, such as an execution management system (EMS), settlement system (SS), or other interface for placing orders directly with an executing broker, including proprietary or custom-built interfaces. The customer 12 may communicate securities trading orders to the OMS 14 of its institutional trading desk via a number of methods, including a telephone, a computer connected to the OMS 14 via the Internet or other communications network such as a local area network (LAN), wide area network (WAN), and so forth. The OMS 14 may be of a type that performs a number of functions, such as trade generation, order routing, and others. For ease of exposition, only a single customer 12 is shown. It will be recognized that there may be any number of customers.

Order staging and optimization software 16 apportions a large order into a plurality of smaller orders with route destinations specified, which are sent to order destinations 20, 22, 24, etc. Three order destinations are depicted for ease of illustration, however, it will be recognized that there may be any number (N) of order destinations. Examples of order staging and optimization software 16 are generally known in the art. Alternatively, smaller orders with route destinations specified may be passed directly to the order destinations 20, 22, 24, etc., by the OMS 14, e.g., via the FIX protocol. Many customers already have extensive FIX connectivity in place between their order management system and executing brokers. The present development provides these customers with an independent post-trade aggregation processing system which is compatible with most customers' existing order management technologies.

The order destinations 20, 22, 24, etc., may be a physical exchange, electronic clearinghouse or exchange, market maker, electronic crossing network (ECN), algorithm desk, program desk, alternative trading system (ATS), or other means for matching buy and sell trades for securities or other financial instruments. The order staging and optimization software 16 routes the smaller orders to the appropriate destinations.

Figure 2:
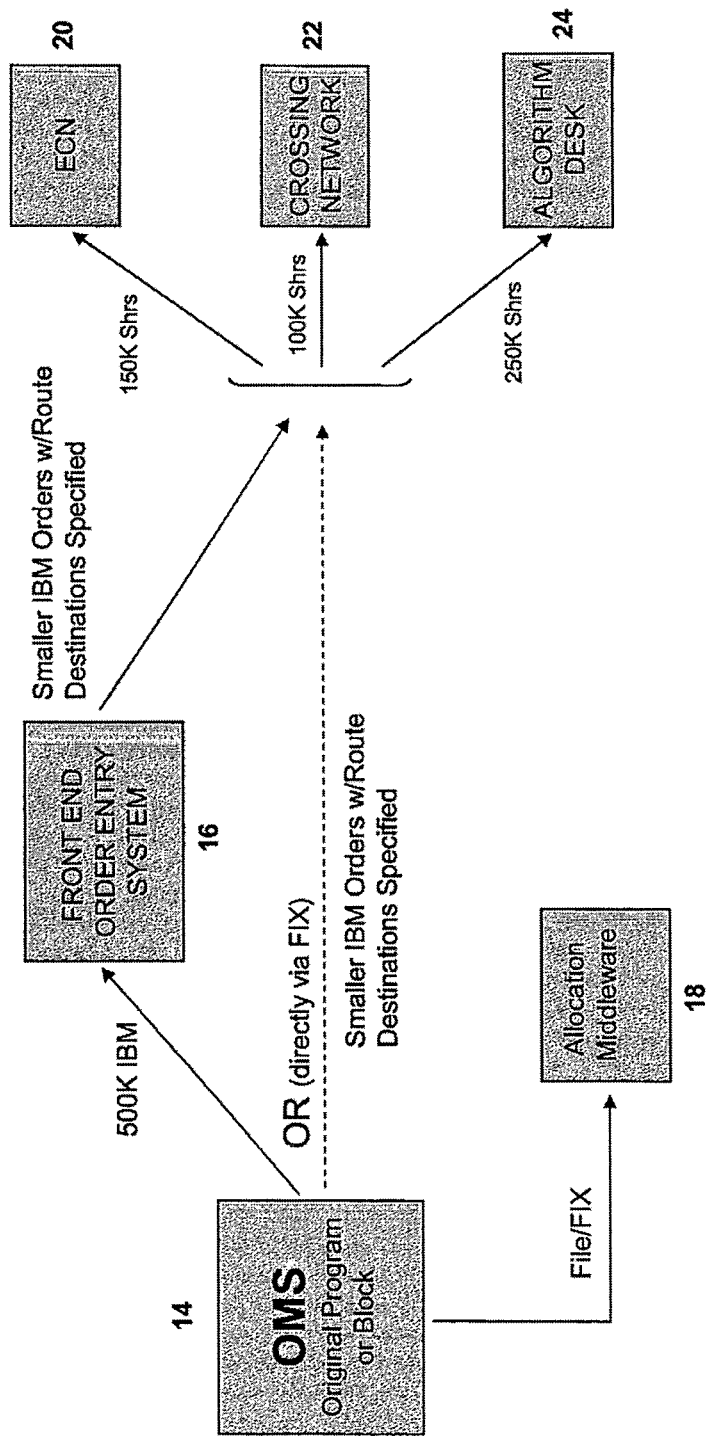
FIG. 2 is a flow diagram of order origination in accordance with an exemplary embodiment of the present invention.

With reference now to FIG. 2, and with continued reference to FIG. 1, a flow diagram appears outlining the order origination process using the order staging and optimization software in accordance with the present embodiment. In the depicted non-limiting example, the customer has an order to execute a trade of 500,000 shares of IBM. The initial order is divided into three smaller orders, either via order staging and optimization software 16, or, is apportioned into three smaller orders directly by OMS 14 and communicated to the order destinations 20, 22, 24, etc., with route destinations specified, e.g., via the FIX protocol or other like protocol. In the example depicted in FIG. 2, the original order of 500,000 shares of IBM is divided into three smaller orders of 150,000, 100,000, and 250,000 orders, which are routed to the order destinations 20, 22, and 24, respectively.

Figure 3:
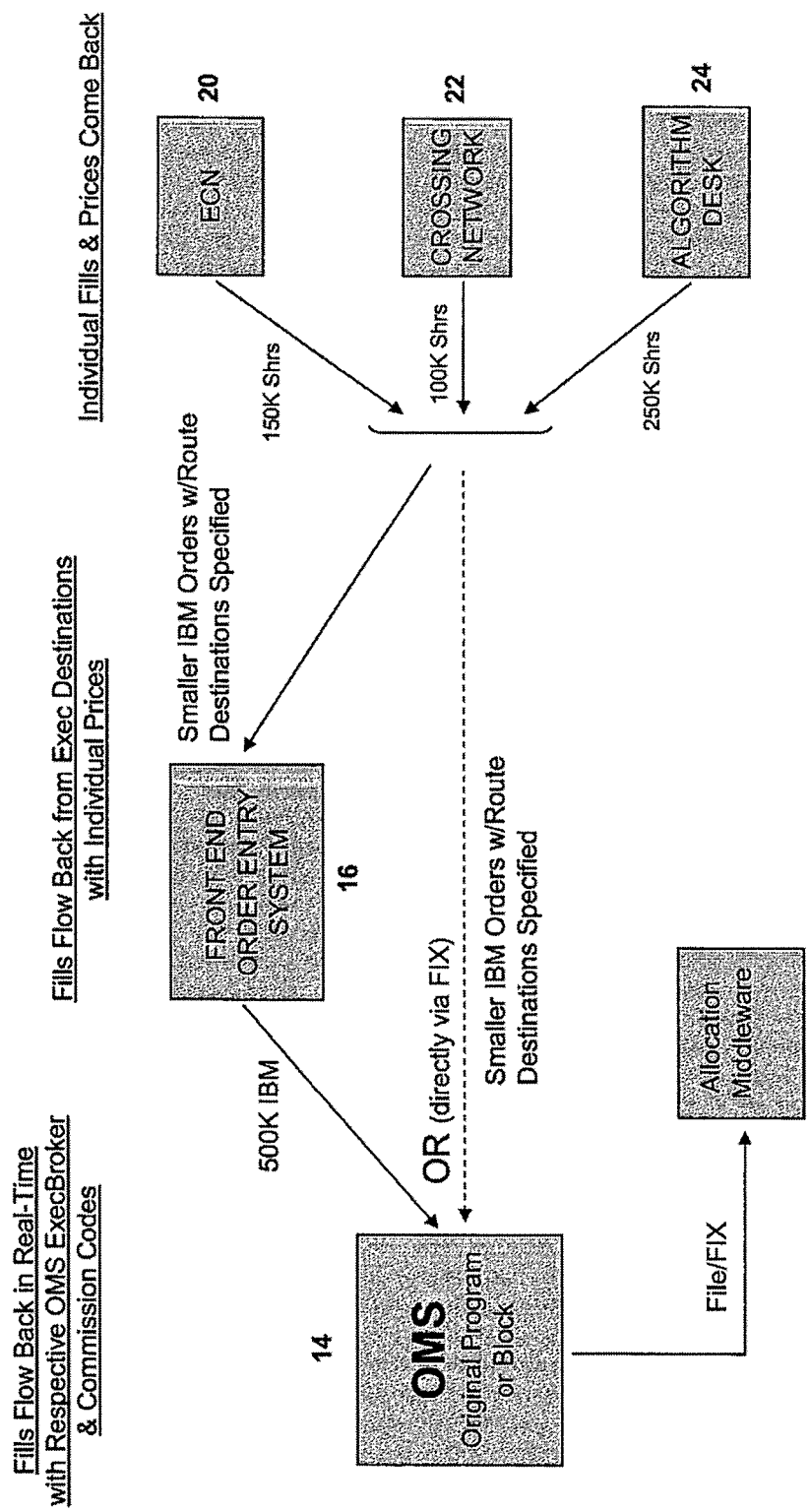
FIG. 3 is a flow diagram outlining order execution in accordance with an exemplary embodiment of the present invention.

The destination brokers 20, 22, and 24 execute the trades in real time throughout the day. Referring now to FIG. 3, with continued reference to FIG. 1, there is shown a flow diagram outlining the executions of the exemplary order illustrated in FIG. 2. The individual fills with individual prices come back from the destinations 20, 22, and 24 to the order staging and optimization software 16. The fills flow back in real time to the OMS 14 from the respective brokers and order destinations.

At the end of each trading day, the executing destination brokers clear the executions, on a block or individual basis, back to the executing broker's designated clearing firm 26 on a broker-to-broker or firm-to-firm basis. The broker-to-broker end-of-day clearance process may be accomplished by a number of methods, including but not limited to correspondent flip, two-sided ACT lock-in, or the like, as would be understood by persons skilled in the art.

Figure 4:
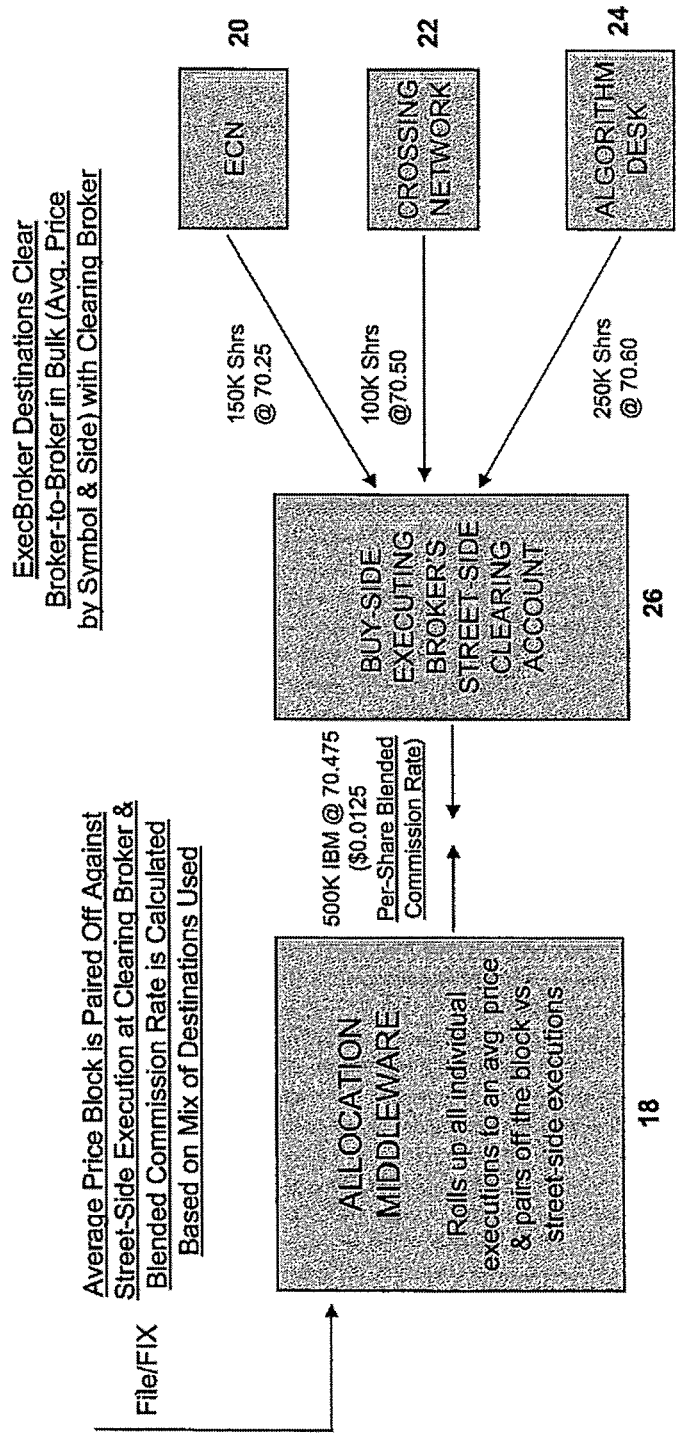
FIG. 4 is a flow diagram illustrating street-side clearing in accordance with an exemplary embodiment of the present invention.

As best seen in FIG. 4, which illustrates the street-side, average-priced clearing process in accordance with the present embodiment, the plurality of smaller trade orders clear in bulk (average price by symbol and side) with the buy-side executing broker's designated clearing firm 26. The allocation 15 middleware 18 compresses all individual executions from the destinations used based on the trade allocation output data from each broker and execution venue used. The individual executions are then compressed to a single volume-weighted, average-priced block (e.g., 500,000 shares of IBM in the depicted embodiment) based on the category or categories designated by the customer. The categories can be selected from common security, side, block ID, account, etc., or a combination thereof. The average-priced block is then paired off against the street-side executions at the designated clearing firm. A blended commission rate may then be calculated based on the mix of order destinations used.

It will be recognized that the allocation middleware 18 and other functional modules as described herein are preferably hosted on a computer based information handling system of the buy-side executing broker and may be implemented in software, hardware, firmware, or combinations thereof, and may employ dedicated processing circuitry or may share common hardware.

The destination brokers or market centers deliver trade executions back to the buy-side executing broker's central street-side clearing account 26 on a broker-to-broker basis at the end of each trading day. The allocation middleware 18 further compresses the trades into average price tickets for central allocation and delivery out to the custodian 28. Since the destination brokers do not allocate and deliver to the custodians directly (e.g., via OASYS), they may not know where the trades are ultimately settling.

A custodian entity 28 holds the securities on behalf of the customer 12. The average-priced block of shares is then allocated and delivered to the appropriate custodial accounts, 32a, 32b, up to 32n of the customer 12. As depicted in FIG. 1, the accounts 32a-32n may be subaccounts under an omnibus custodial account 30 of the customer 12. In an alternative embodiment to FIG. 1, the allocated average-priced block of shares may be delivered directly to the custodial accounts, 32a, 32b, up to 32n, from the allocation middleware 18. The subaccounts may be, for example, funds, pension funds, or other accounts managed by the customer 12. Three subaccounts are depicted in FIG. 1 for ease of illustration, however, it will be recognized that there may be any number (n) of subaccounts.

Figure 5:
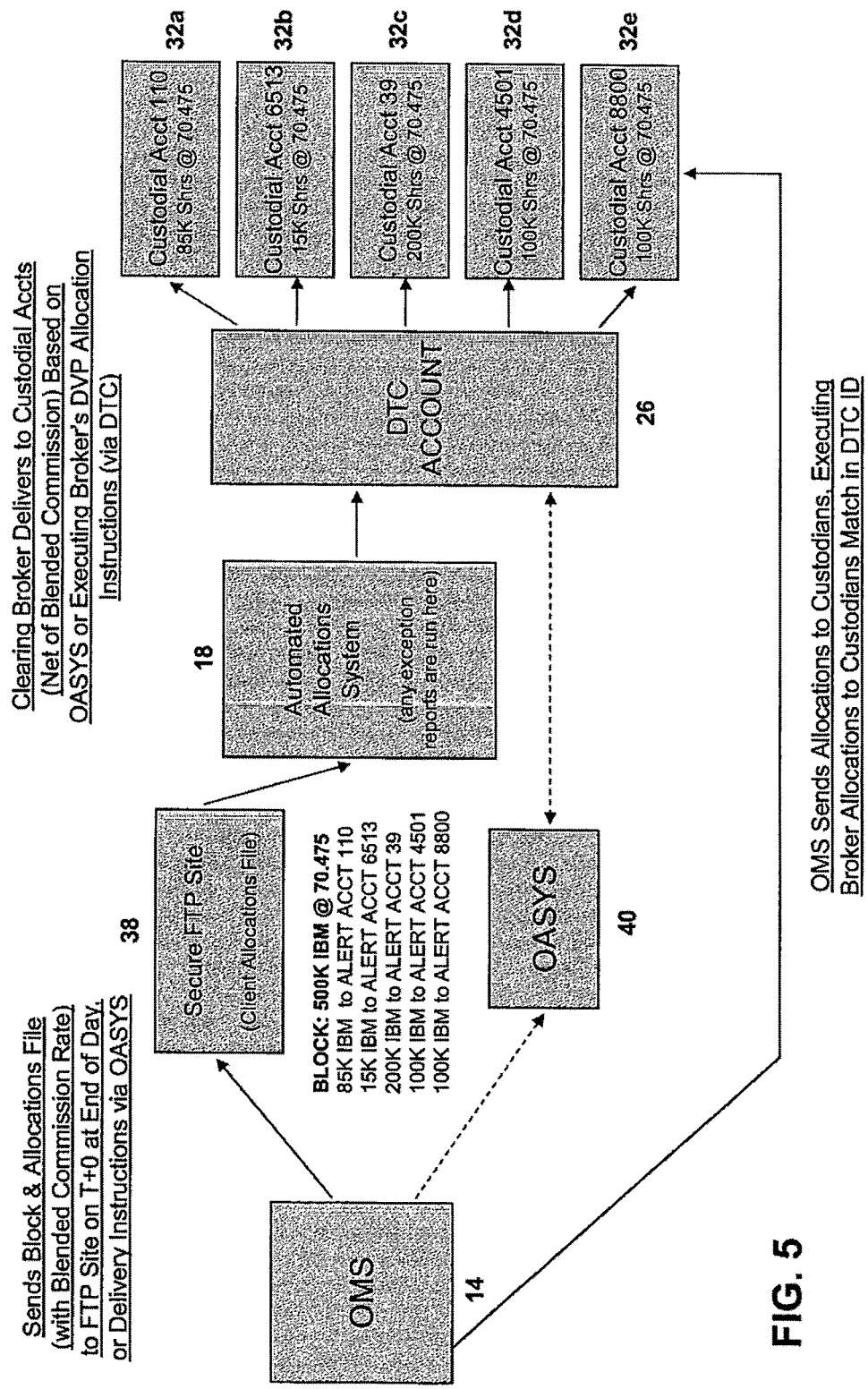
FIG. 5 is a flow diagram illustrating allocation and delivery in accordance with an exemplary embodiment of the present invention.
Figure 6:
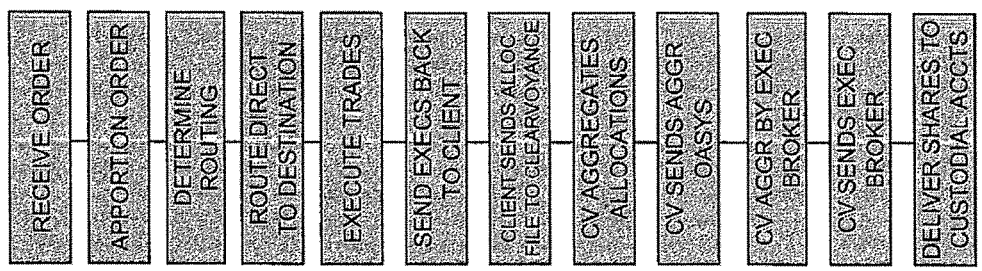
FIG. 6 is a flow diagram outlining an exemplary method in 20 accordance with the present invention.

As best seen in FIG. 5, and referring to the example illustrated in FIGS. 2 through 4, the OMS 14 sends the allocations to the custodian 26. The OMS 14 also sends block and allocation information to the middleware 18, e.g., via a secure server 38. The middleware 18 then sends allocation instructions to the designated clearing agent or broker 26, e.g., via its depository trust company (DTC). The OMS 14 allocation information and buy-side executing broker delivery versus payment (DVP) allocation instructions (or journal entry where the trade clears locally, i.e., at the same institution that executed the trade) match in the DTC ID. The clearing agent 26 then delivers the shares to the various subaccounts based on the allocation instructions. It will be recognized that alternative allocation programs or methods 40, such as OASYS, fixed instructions/default, percent based, fix message, file based, API, manual, and others, may be used to communicate the allocation instructions from OMS 14 to the clearing firm 26 and allocation middleware 18. In the depicted embodiment, the middleware 18 compresses the trades into a single trade of 500,000 shares of IBM at an average price of $70.475, resulting in a substantial reduction in custodial ticket and other costs for the customer 12. A flow chart outlining the above-described process appears in FIG. 6.

Figure 7:
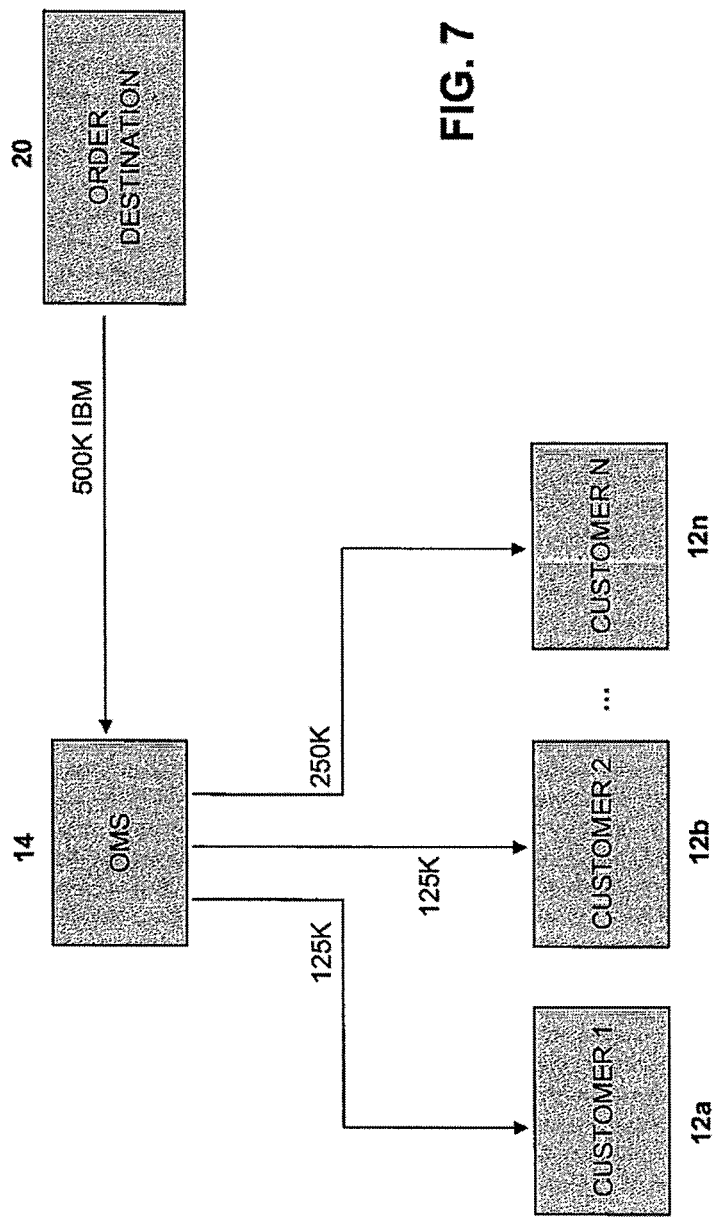
FIG. 7 is a flow diagram illustrating a further embodiment providing trade compression for all trades in a single security for a given destination broker, with one set of allocations for that security being delivered out to multiple customer accounts.

Referring now to FIG. 7, a further aspect of the post-aggregation processing system and method in accordance with the present embodiment optionally allows destination brokers to roll up and average by price all trades in a given security for multiple (up to any number, N) customers 20a, 20b, up to 20n. The trades flow back to the allocation middleware 18 in a single ticket, thereby reducing the probability of errors and resulting in substantial cost savings, such as ticket, labor, trade breaks, research, labor costs, and so forth.

Figure 8:
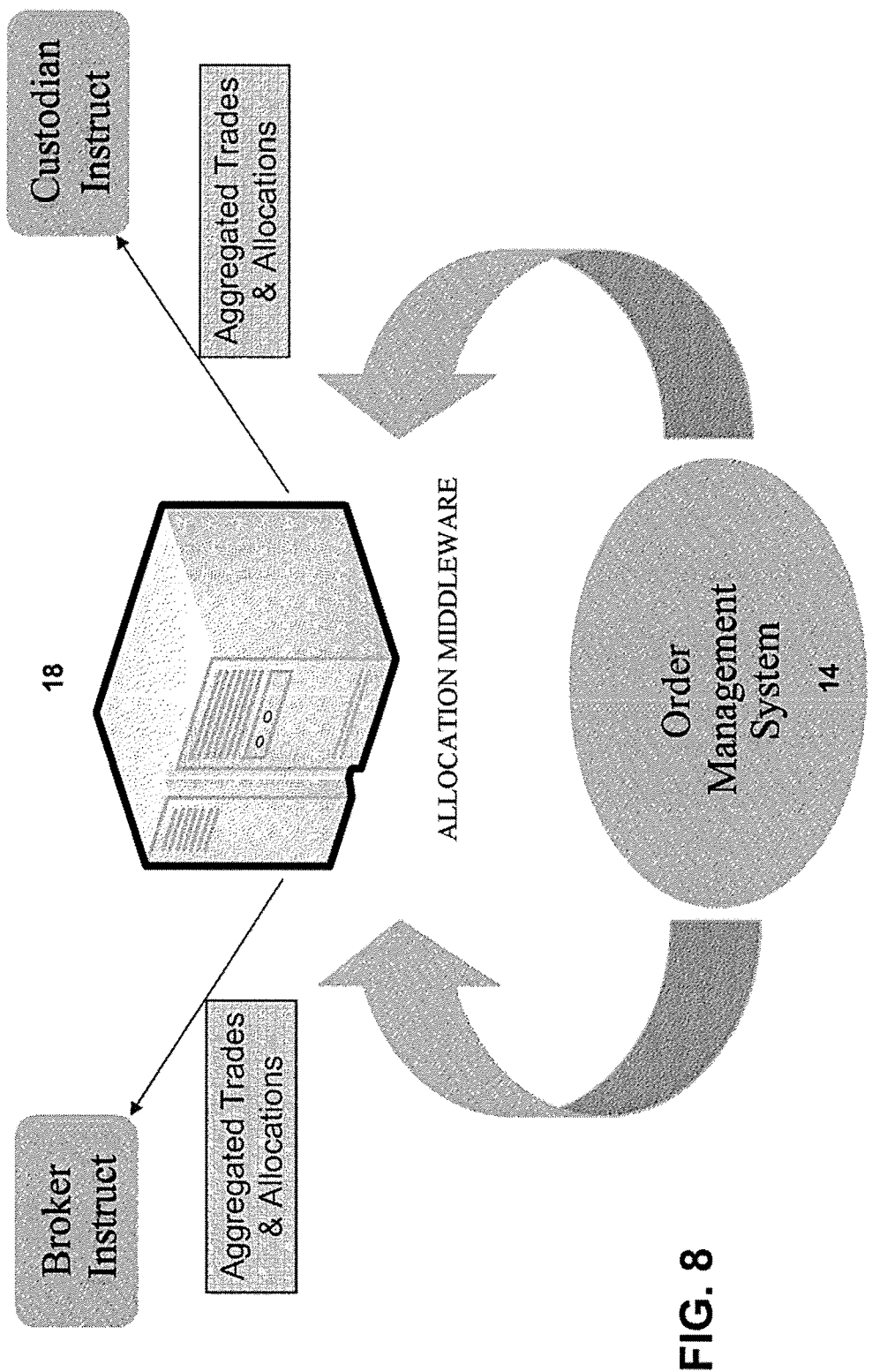
FIG. 8 is a flow diagram illustrating the post-trade aggregation process in accordance with the present invention.

As depicted in FIG. 8, the order management system 14 provides allocation information to allocation middleware 18, which in turn provides instructions to the clearing agent 26 and custodian 28. The allocation middleware 18 can be customized to each customer's desired specifications. Such customizations may include, for example, type of data interface, aggregation scheduling, designation of brokers, execution services, clearing firms, clearing firm settings, allocation rules, market configuration, and asset configuration. This customization enables the post-trade aggregation system to reduce costs for customers by working with their current technologies and providing an aggregation of trades to reduce post trade clearing costs.

In certain embodiments, the allocation middleware 18 can be programmed to run in simulation mode to perform an aggregation allocation without actually purchasing and going through the steps of clearing and settlement. In this manner, customers can determine the costs associated with making certain trades without actually performing the trade. In addition, the allocation middleware 18 may have reporting and research interfaces added to the system. A reporting interface may be provided to enable the user to create various reports such as aggregation savings reports, clearing impact reports, order fragmentation reports, transaction cost analysis reports, peer analysis reports, STP and fail rate reports, error and trade break reports, and others. A research interface may be provided to enable the user to perform real-time and historical trade research to obtain such information as block ID, allocation ID, trade date, trade range, security ID, ticker, name, account, broker, broker code, status, comparisons of original records and aggregation records, and so forth.

Figure 9:
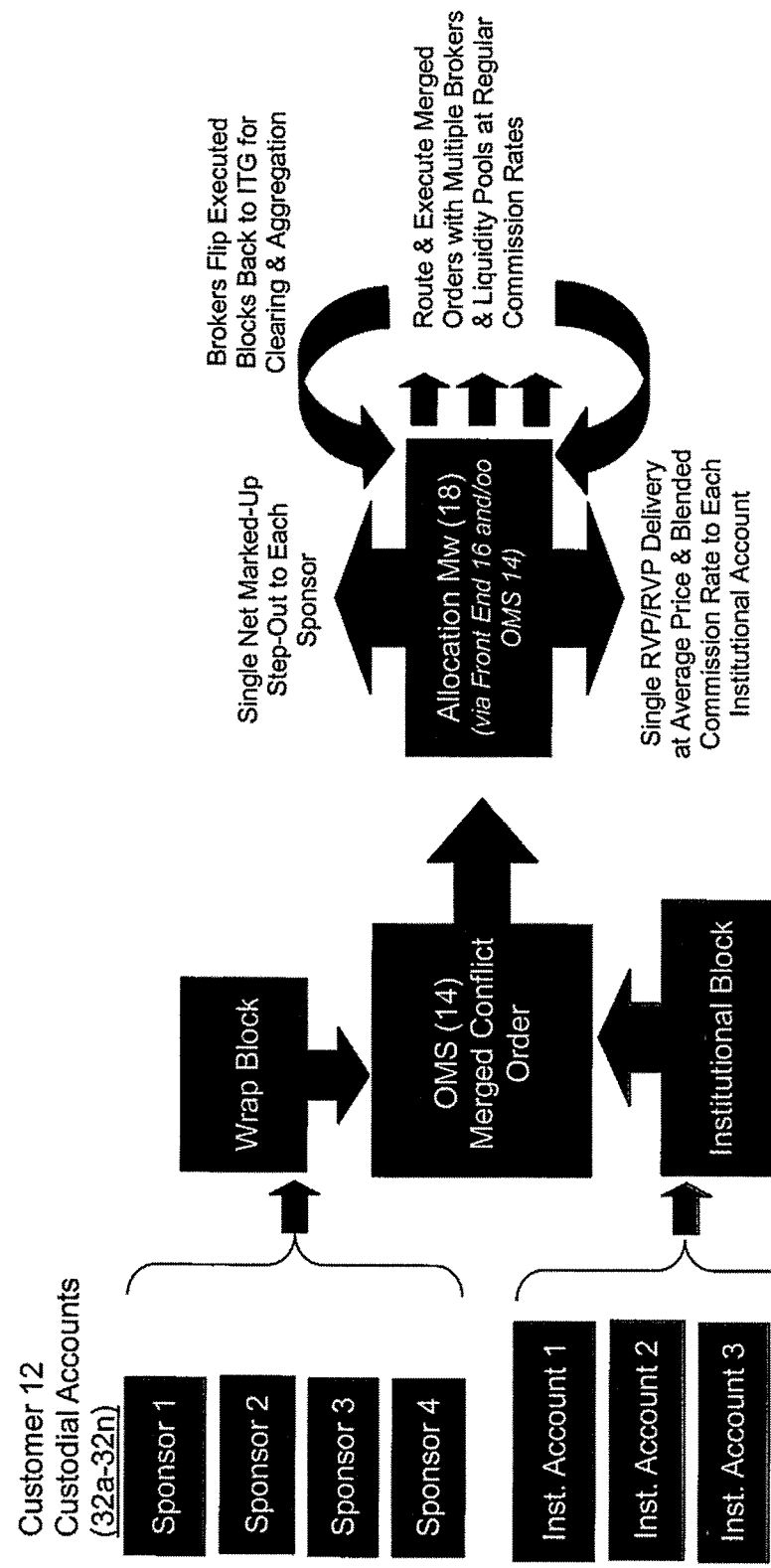
FIG. 9 is a flow diagram of a trading system having a post-trade aggregation process in accordance with an embodiment of the present invention.

The skilled person will understand that the present invention is also applicable to what is known as the "wrap" business wherein all expenses relating to the account, including commissions, are wrapped into a single fee. FIG. 9 is flow diagram illustrating a simple dataflow for allocating and aggregating both institutional block trades as well as wrap block trades according to embodiments of the present invention.

As shown in FIG. 9, customers 12 include both wrap accounts (sponsors 1-4) and institutional accounts (Inst. Accounts 1-4). These customers can send in wrap block orders as well as institutional block orders to a trader by means already explained herein. The blocks are merged into a conflict order on the traders OMS 14. Allocation middleware 18 is configured to route and execute merged orders with multiple destinations (e.g., brokers, liquidity pools) at regular commission rates. Executed blocks are flipped back to the allocation middleware 18 via means as already described herein. Single net marked-up "step-outs" can be made to each sponsor. At the same time, single RVP delivery at average price and blended commission rate is made to each institutional account. The skilled person should understand that a step-out occurs when an order is executed by one or several brokerage firms and then upon completion, the executing broker or brokers are instructed by their client to transfer (step out) all or a portion of the executed trade to another broker, for the purposes of paying commissions or assigning credit on that portion of the trade to the receiving broker, who may in turn be proving research or analytic services to the client. Note that a trade executed with one or several brokers can also be stepped out to one or several brokers, making the step-out process quite complex. The Allocation Middleware (18) is designed to simplify this process by creating a single step-out to one or several sponsors at the same net price, even under circumstances where a trade may be executed with several brokers.

Figure 10:
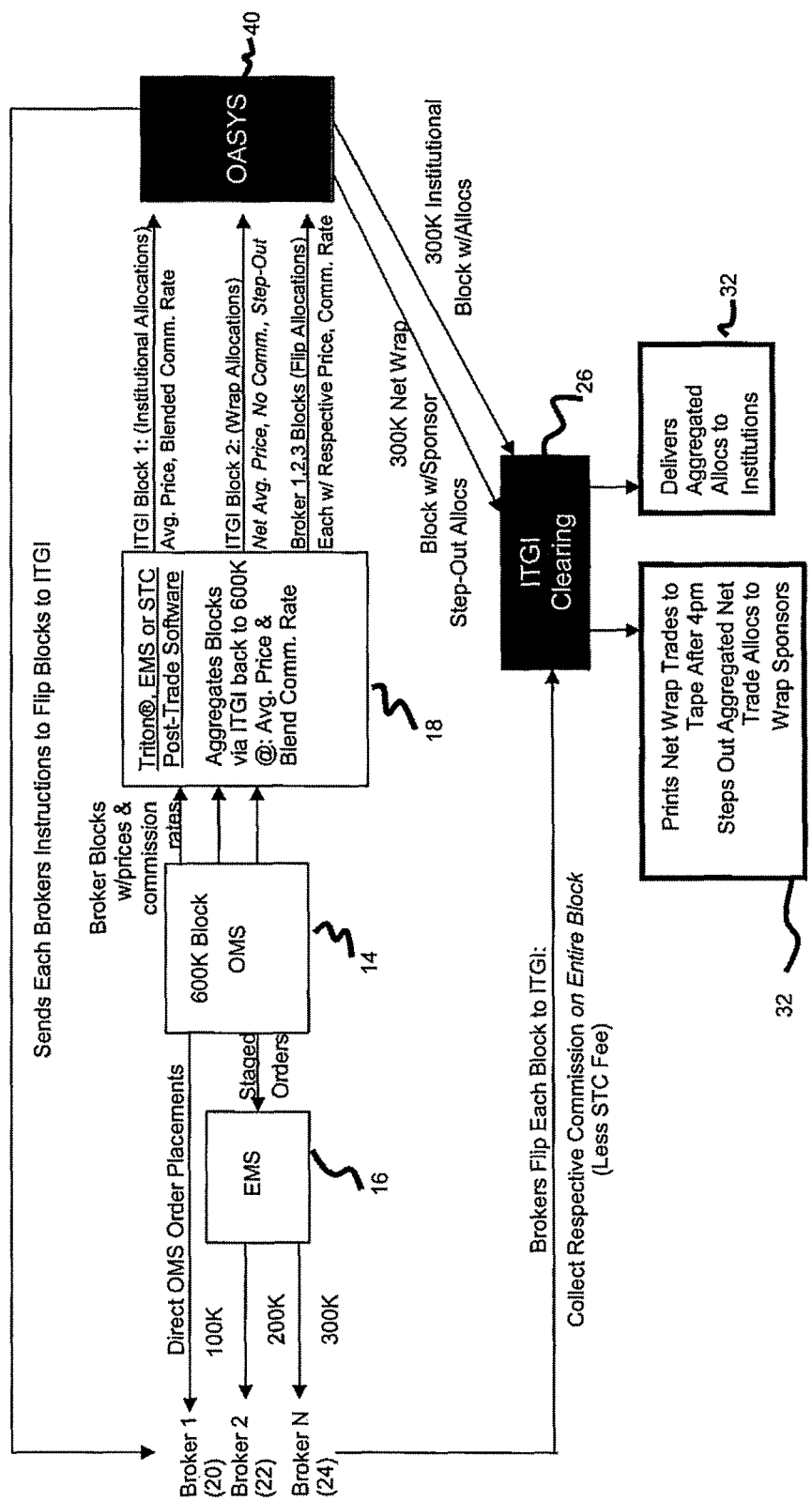
FIG. 10 is an block diagram illustrating the flow of a block trade post-trade aggregation process in accordance with an embodiment of the present invention.

FIG. 10 is block diagram illustrating a more detailed, example process flow according to embodiments of the present invention. In this example, a buy-side trader may make a single 600 k share block trade for institutional and wrap as already described above, for example, via multiple destinations 20-24 (in this case brokers 1-N) through OMS 14 or staged via a front end system or optimizer 16. Orders will be executed at or by each destination at a respective price and incur commissions at a commission rate. Executions data flows back to the EMS and OMS by conventional means with their respective prices and commission rates.

Buy-side trader side post-trade system 18 (which can be implemented as part of the EMS or as a separate system, e.g., server) that is configured to aggregate each block in the same manner, booking all allocations, in this example, through available known allocation programs or methods 40, such as OASYS, fixed instructions/default, percent based, fix message, file based, API, manual, and others, may be used to communicate the allocation instructions, from OMS 14 to the clearing firm 26. OASYS is a U.S. domestic trade allocation and acceptance service provided by OMGEO that communicates trade and allocation details between investment managers and broker/dealers. OASYS can be used in place of other communication means such as faxes, phone calls and e-mail. The skilled person will understand that a secure service 40 other than OASYS may also be used to book the allocations.

The allocation middleware 18 is configured to intercept the OASYS 40 allocations, to aggregate them, and to split the institutional shares and wrap shares into separate ITGI blocks. Allocation middleware 18 is configured then to add/subtract the blended commission rate from the average aggregated price for only the wrap allocations to create a new, net average price block and set of step-out allocations. Allocation middleware 18 is also configured to send institutional block and allocations, and net wrap block and step-out allocations, over OASYS 40 to clearing agent 26 after market close.

Clearing agent 26 prints each new net wrap block trade to the tape. The clearing agent 26 delivers aggregated Institutional allocations to accounts via RVP/DVP, and steps-out net wrap allocations to each wrap sponsor at new printed, marked-up price with no commission rate. Each broker receives instructions over OASYS to flip their block to ITG, at their respective execution price. ITG pays each broker its respective commission rate (less the STC fee) for the entire executed block.

Wrap sponsors 32 each receive one net average-priced step-out trade from ITG; the buy-side trader has thus avoided the need for sponsor trade rotation and ensured performance parity across sponsors and institutional customers.

In this example, Trader has 100,000 share "merged" block (which contains allocations for both Wrap and Institutional business) in the OMS.

Trader Executes with 2 brokers:

| T | 25,000 with Broker1 at $30.00 Price | $0.02 Commission Rate |
|---|---|---|
| A | ACCT1 | 12,500 | |
| A | ACCT2 | 12,500 | "Net Mark Up" = Y |
| T | 75,000 with Broker2 at $31.00 Price | $0.01 Commission Rate |
| A | ACCT1 | 37,500 | |
| A | ACCT2 | 37,500 | "Net Mark Up" = Y |

Outbound to clearing agent 26 (e.g., ITGI) from Middleware 18→OASYS 40:

| T | 50,000 | $30.75 Price | $0.0125 Commission Rate |
|---|---|---|---|
| A | ACCT1 | 50,000 | $0.0125 Commission Rate |
| T | 50,000 | $30.7625 Price | |
| A | ACCT2 | 50,000 | $0 Commission Rate, Step Out To: WRAP1* |

Outbound to destination 20 (e.g., Broker1) from Middleware 18→OASYS 40:

| T | 25,000 $30.00 Price, | $0.019 Commission Rate (is less a typical 10 mil fee) |
|---|---|---|
| A | ITG1 25,000 | $0.019 Commission Rate |

Outbound to destination 22 (e.g., Broker2) from Middleware 18→OASYS 40:

| T | 75,000 $31.00 Price, | $0.009 Commission Rate (is less a typical 10 mil fee) |
|---|---|---|
| A | ITG1 75,000 | $0.009 Commission Rate |

This trade/allocation can be sent post-close over, e.g., OASYS 40 to clearing agent 26 and can be printed by the clearing agent 26 to ACT as a .N trade, after market close. It can then be stepped out from clearing agent 26 to WRAP1 sponsor accordingly.

As a result of the foregoing work flow, novel systems and methods are provided for merging wrap and institutional conflict trades into a single block in an OMS. Multiple destinations and liquidity seeking tools can still be used to achieve best execution. Orders can be aggregated by allocation middleware 18 to reduce step-outs and institutional deliveries—performance parity across both wrap and institutional accounts can be maintained and brokers can be paid for best-execution services for entire workflow.

Certain embodiments of the invention may be implemented as sets of instructions resident in non-transitory memory of handling system or other storage device of one or more computer systems until required by the computer system. The set of instructions may be stored in an electronic or computer readable non-transitory memory, such as a main memory, hard disk drive, or in a removable memory such as an optical disc, a magnetic media, and so forth. Further, the set of instructions can be stored in the non-transitory memory of another computer and transmitted over a local area network or a wide area network, such as the Internet, when desired by the user. Additionally, the instructions may be transmitted over a network in the form of an applet or other small program that is then local stored in non-transitory memory and interpreted then. One skilled in the art would appreciate that the physical storage of the sets of instructions or applets physically changes the medium upon which it is stored electrically, magnetically, chemically, physically, optically, or holographically so that the medium carries computer readable information.

While various embodiments/variations of the present invention have been described above, it should be understood that they have been presented by way of example only, and not limitation. Thus, the breadth and scope of the present invention should not be limited by any of the above-described exemplary embodiments. Further, unless stated, none of the above embodiments are mutually exclusive. Thus, the present invention may include any combinations and/or integrations of the features of the various embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

We claim:

1. An automated data tracking system, comprising:
    a data interface for managing a plurality of electronic orders transmitted to one or more executing brokers, said plurality of electronic orders including at least one wrap block order and at least one institutional block order;
    an automated system for receiving data for said plurality of electronic orders and automatically merging the plurality of electronic orders into a single merged block order, apportioning the single merged block order into a plurality of smaller electronic orders, and electronically communicating the plurality of smaller electronic orders to a plurality of order destinations; and
    a post-trade aggregation system configured to receive execution data from the plurality of order destinations for individual executions corresponding to the plurality of smaller electronic orders and automatically to compress the individual executions into a single net marked-up step-out for wrap orders and a single average-priced block for institutional orders;
    wherein the system for merging is an algorithmic trading and routing server remotely located from data interface;
    the plurality of order destinations are electronic destinations that automatically execute matches of electronic orders without human intervention and, for each match, automatically generates and transmits execution data for each individual executions; and
    said post-trade aggregation system is further configured to intercept execution data transmitted by the plurality of order destinations to said data interface.

2. The tracking system of claim 1, wherein said post-trade aggregation system is further configured to allocate each block among a plurality of custodial accounts based on received allocation information.

3. The tracking system of claim 1, wherein said data interface is selected from an order management system, an execution management system, and settlement system.

* * * * *